(12) United States Patent
Reniere et al.

(10) Patent No.: US 8,130,660 B2
(45) Date of Patent: Mar. 6, 2012

(54) SYSTEM AND METHOD OF REMOTE TESTING IN LOOPBACK MODE USING MGCP/NCS

(75) Inventors: Martin Reniere, St-Lambert (CA); Yassine Boujelben, Montreal (CA)

(73) Assignee: Tektronix, Inc., Beaverton, OR (US)

( * ) Notice: Subject to any disclaimer, the term of this patent is extended or adjusted under 35 U.S.C. 154(b) by 484 days.

(21) Appl. No.: 12/298,293

(22) PCT Filed: Apr. 25, 2007

(86) PCT No.: PCT/CA2007/000659
§ 371 (c)(1),
(2), (4) Date: Oct. 23, 2008

(87) PCT Pub. No.: WO2007/121561
PCT Pub. Date: Nov. 1, 2007

(65) Prior Publication Data
US 2009/0161565 A1    Jun. 25, 2009

Related U.S. Application Data

(60) Provisional application No. 60/794,594, filed on Apr. 25, 2006.

(51) Int. Cl.
*G06F 11/00* (2006.01)
(52) U.S. Cl. .................. 370/249; 370/216; 370/224
(58) Field of Classification Search ............ 370/216, 370/224, 236, 241, 249, 252
See application file for complete search history.

(56) References Cited

U.S. PATENT DOCUMENTS

| | | | |
|---|---|---|---|
| 5,164,960 A * | 11/1992 | Wincn et al. | 375/224 |
| 6,335,927 B1 | 1/2002 | Elliott et al. | |
| 7,173,910 B2 * | 2/2007 | Goodman | 370/252 |
| 7,248,682 B1 * | 7/2007 | Oran | 370/395.52 |
| 7,535,847 B1 * | 5/2009 | Hansen et al. | 370/241 |
| 7,564,840 B2 * | 7/2009 | Elliott et al. | 370/356 |
| 7,567,520 B2 * | 7/2009 | Ostrosky | 370/252 |
| 7,706,293 B2 * | 4/2010 | Wang | 370/249 |
| 2002/0010865 A1 * | 1/2002 | Fulton et al. | 713/201 |
| 2002/0064149 A1 | 5/2002 | Elliott et al. | |
| 2002/0167936 A1 * | 11/2002 | Goodman | 370/352 |
| 2002/0176542 A1 * | 11/2002 | Lazarus et al. | 379/3 |
| 2003/0115368 A1 * | 6/2003 | Wu | 709/251 |

(Continued)

OTHER PUBLICATIONS

Extended European Search Report for EPO Application No. 07719586.5, Jun. 2, 2009, European Patent Office.

(Continued)

*Primary Examiner* — Kwang B Yao
*Assistant Examiner* — Nguyen Ngo
(74) *Attorney, Agent, or Firm* — Matthew D. Rabdau; Michael J. Fogarty, III

(57) ABSTRACT

This invention relates to a system and method of monitoring, by establishing end to end loopback testing across one or more networks with dissimilar transport technologies. The system allows for connection in loopback mode from a standard interface on a test device to a media adaptor located on an IP-based access network, such as a standard multimedia terminal adapter ("MTA"). End-to-End Quality of service delivered over the transmit and receive path can thus be monitored. Loopback tests are initiated from designated endpoints on the network and made operational by attaching a tag to a telephone number, to allow the gateway to signal connection mode to a call agent. The system and method overcome certain inherent limitations of the MGCP/NCS architecture.

8 Claims, 3 Drawing Sheets

U.S. PATENT DOCUMENTS

| | | | |
|---|---|---|---|
| 2003/0185210 | A1 | 10/2003 | McCormack |
| 2004/0208192 | A1 | 10/2004 | Yoshihara et al. |
| 2004/0258238 | A1 | 12/2004 | Wong |
| 2005/0251858 | A1* | 11/2005 | DelRegno et al. .............. 726/22 |
| 2005/0261860 | A1* | 11/2005 | Lobig ........................... 702/122 |
| 2010/0182914 | A1* | 7/2010 | DelRegno et al. ............ 370/249 |

OTHER PUBLICATIONS

Flemming Andreason et al., Media Gateway Control Protocol (MGCP) Version 1.0, RFC 3435, Jan. 2003, pp. 1-210, The Internet Society, Network Working Group, USA.

Cable Television Laboratories, Inc., PacketCable NCS Basic Packages Technical Report, PKT-TR-MGCP-PKG-V01-020315, Mar. 15, 2002, pp. 1-21, Cable Televsion Laboratories, USA.

Extended European Search Report for EPO Application No. 07 719 586.5, Jun. 2, 2009, European Patent Office.

The International Bureau of WIPO, PCT-Notificaiton Concerning Transmittal of Internaitonal Preliminary Report on Patentability (Chapter 1 of the Patent Cooperation Treaty) (PCT Rule 44bis. 1 (c) ), PCT/CA2007/000659, Apr. 25, 2007, 7 pages.

* cited by examiner

SYSTEM AND METHOD OF REMOTE TESTING IN LOOPBACK MODE USING MGCP/NCS

This application claims the benefit U.S. provisional application No. 60/794,594, entitled MTA Loopback Testing via Network Gateway by Martin Reniere filed Apr. 25, 2006.

BRIEF DESCRIPTION OF THE INVENTION

This invention relates to a system and method of monitoring, by establishing end to end loopback testing across one or more networks with dissimilar transport technologies. The system allows for connection in loopback mode from a standard interface on a test device to a media adaptor located on an IP-based access network, such as a standard multimedia terminal adapter ("MTA"). End-to-End Quality of service delivered over the transmit path and the receive path can thus be monitored. Loopback tests are initiated from designated endpoints on the network and made operational by attaching a tag to a telephone number, to allow the gateway to signal connection mode to a call agent. The system and method overcome certain inherent limitations of the MGCP/NCS architecture

BACKGROUND OF THE INVENTION

As the number of subscribers for telephone, internet and video services continues to grow throughout the world, so does the need to support and maintain such services, as well as the devices forming part of a communications network. Many believe that to keep up with the accelerated demand for such services, current strategies for using and developing known protocols require further development.

A new paradigm of testing the quality of services delivered over a network is to conduct such testing by remotely accessing a subscriber site. Remote access has several advantages, including increasing availability, efficiency, and affordability. However, the application of the MGCP/NCS protocol to a test device acting as or behind a gateway, to initiate a connection in loopback mode with a remote endpoint device located on a subscriber's site, such as an MTA has not been disclosed in the prior art. Indeed, the IETF RFC 3435 MGCP and the PacketCable NCS specifications, which describes a master slave protocol, does not foresee such application.

Loopback-based testing is an obvious and classical way to test the quality of transmission on the path used to carry media over networks which use different technologies. Because of the complexity and time required to migrate media transport from various technology-based networks to a single technology transport packet-based network, hybrid networks proliferate. Accordingly, there is a pressing need for new techniques to test the quality of integrated services over hybrid networks, in an economically efficient manner.

As shown in the prior art, general network architecture consists of a packet-based core network interconnecting various access networks via appropriate gateways. Media Gateway Control Protocol (MGCP) and its variation Network-based Call Signalling (NCS) were developed in order to control the different gateways within the packet-based networks. MGCP/NCS is a signalling protocol based on the Internet Protocol (IP) controlling a master slave dialog, where the master is the Call Agent (CA) or Call Management Server (CMS), commonly integrated in a smart switch (sometimes referred to as a "soft switches"). The slaves are the gateways. The CA creates connections between endpoints which negotiate media session parameters via Session Description Protocol (SDP). MGCP/NCS describes different connection modes, depending on the connection purpose and the call placement progress. Besides standard call connection modes, there are two monitoring modes: Network Loopback and Network Continuity Test. As used herein, the following terms are accorded acronyms in common use: Network Loopback: RTP LB; Network Continuity Test: Audio LB.

The prior art discloses signalling limitations inherent in MGCP/NCS architecture. The invention enables use of the MGCP/NCS protocol: by attaching a tag, such as a prefix or suffix, to the remote address, e.g. a phone number, the dumb gateway can signal connection mode to an intelligent CA. Signalling limitations in the MGCP/NCS protocol with respect to establishing connection across a network using multiple technologies are addressed by using a numbering plan which is supported by analog, TDM and packet based signalling protocols, including PSTN (SS7), ISDN (Q.931) and Internet (MGCP, SIP).

The prior art teaches away from the use of MGCP outside the Internet. This invention profits from the fact MGCP supports the same numbering plan as other legacy signalling protocols to expand the architecture of the services.

The prior art discloses solutions which differ from the system and method of the invention. In the prior art, for example, a special signalling protocol may be put in place between the test device and the CA allowing the test device to communicate the desired connection mode to the CA, and a connection may be established between the test device and the endpoint device in a standard connection mode from a point of view of the CA, but the test device communicates directly the loopback mode to the endpoint device via special SDP attributes, a solution which is particular to a packet-based network.

The second solution of the prior art has been described in a draft from the Internet Engineering Task Force (IETF). A special extension is required on the SDP standard in order to add loopback connection modes. This solution is generic and may be used for different IP-based signalling protocol using SDP for media description, e.g., MGCP, SIP.

A need has been felt, because of limitations inherent in the prior art, to adapt the MGCP/NCS protocols to hybrid networks in which an endpoint is outside the IP network.

The invention describes a system and method of establishing a connection in loopback mode in the MGCP/NCS protocol so as to enable communication between remote endpoints of a network comprising diverse protocols. A test device sends traffic through the network under test, towards an endpoint termination which loops the traffic back to the test device. The termination endpoint may incorporate specific test and measurement software or/and hardware installed permanently or temporarily by technicians in the peripherals of a network to test or troubleshoot some problems, or a customer-owned device such as a cable modem.

The test device or other management entity analyses data and determines the quality of the end-to-end two-way transmission. The technique widely used for legacy Public Switched Telephone Networks (PSTN) and Integrated Services Digital Networks (ISDN), namely for Trunk testing. However, it is still not yet implemented on hybrid networks implying at least one packet-based network, waiting for enabling technologies. This invention makes a contribution towards implementing loopback testing for IP-based services.

Advantages of the system and method of the invention include:
- availability of the native MGCP loopback modes;
- no extension to existing protocols is required;
- no substantive change is required on the MGCP/NCS capable endpoint, with limited preconfigured information on a switch;
- the invention is not IP dependant. Therefore, it may easily be used by test devices on different access networks;
- improved scalability of the network or networks;
- improved affordability and appeal to subscribers with standard MTA, mass marketed products;
- improved timing of delivery.

DETAILED SUMMARY OF THE INVENTION

In one implementation of the invention, the system for establishing a remote test in loopback mode between an interface located on a test device having an endpoint within access of the network comprising a test probe, an MGCP or NCS multimedia terminal adapter (MTA), a trunk gateway operable for bridging at least two different networks, one of which network is a packet-based network; and a switch preconfigured with preferably two tags for controlling establishment of the loopback connections between the probe and the adapter. The test device attaches a tag to the phone number that it dials to join the remote endpoint. The CA removes the tag and translates it according to a preconfigured table, into a loopback mode. Two tags advertise the two loopback modes: one for the RTP LB and the other for the Audio LB. The system is operable for looping back the media transmitted from the probe to the adapter for testing the end to end quality of services delivered over the network.

In one implementation of the method of the invention, testing the quality of data, voice, video and multi-media-based services carried over a communication system comprising a probe, trunk gateway, switch and adapter, the probe, trunk gateway and switch being pre-configured for the protocol of the invention, a tag is attached to the phone number of an analog port on the adapter. The tags are preconfigured on the switch for connection between the probe and the adapter. SSRC collision detection and echo cancellation on the trunk gateway are disabled. A connection on the probe is established by dialing a number corresponding to a port on the adapter with one prefix of the loopback mode. Translation of the tagged loopback modes is effected by operation of the switch. The phone number is correlated with the operation of the IP address of the adapter. The exchange of signalling information between the adapter and the trunk gateway is controlled by means of the switch. The test device sends traffic, through the network under test, towards an endpoint termination which loops the traffic back to the test device. The termination may be a specific test and measurement software and/r hardware installed permanently or temporarily by technicians in the peripherals of a network to test or troubleshoot problems, or a customer-owned device such as a cable modem. Signalling information, obtained by means of the trunk gateway using one of the MGCP or NCS signalling protocols, is forwarded back to the probe in a packet-based format.

In a different embodiment of the system and method of the invention, the loopback test conducted on packet networks. The test device is the gateway.

As shown, the systems include a gateway but when the probe and the MTA are both connected to the packet network, the probe is acting as the media gateway. When the probe acts in a hybrid technology context, it acts behind a gateway.

Test device or other management entity analyses data and determines the quality of the end-to-end two-way transmission. The technique widely used for legacy Public Switched Telephone Networks (PSTN) and Integrated Services Digital Networks (ISDN), namely for Trunk testing.

- In RTP LB, packets are looped back to the transmitter as they are.
- In Audio LB, packets are depacketized, decoded, re-encoded, re-packetized and then looped back to the transmitter;
- The CA directs the gateways as to the mode of communication. For example, if the CA orders the gateway to be in "recvonly" mode, it is only allowed to receive media, but never send;
- When a test device wants to establish a connection in loopback mode with a remote endpoint device, it has no way to do that according to MGCP/NCS description.

DETAILED DESCRIPTION OF THE INVENTION

Figure 1:
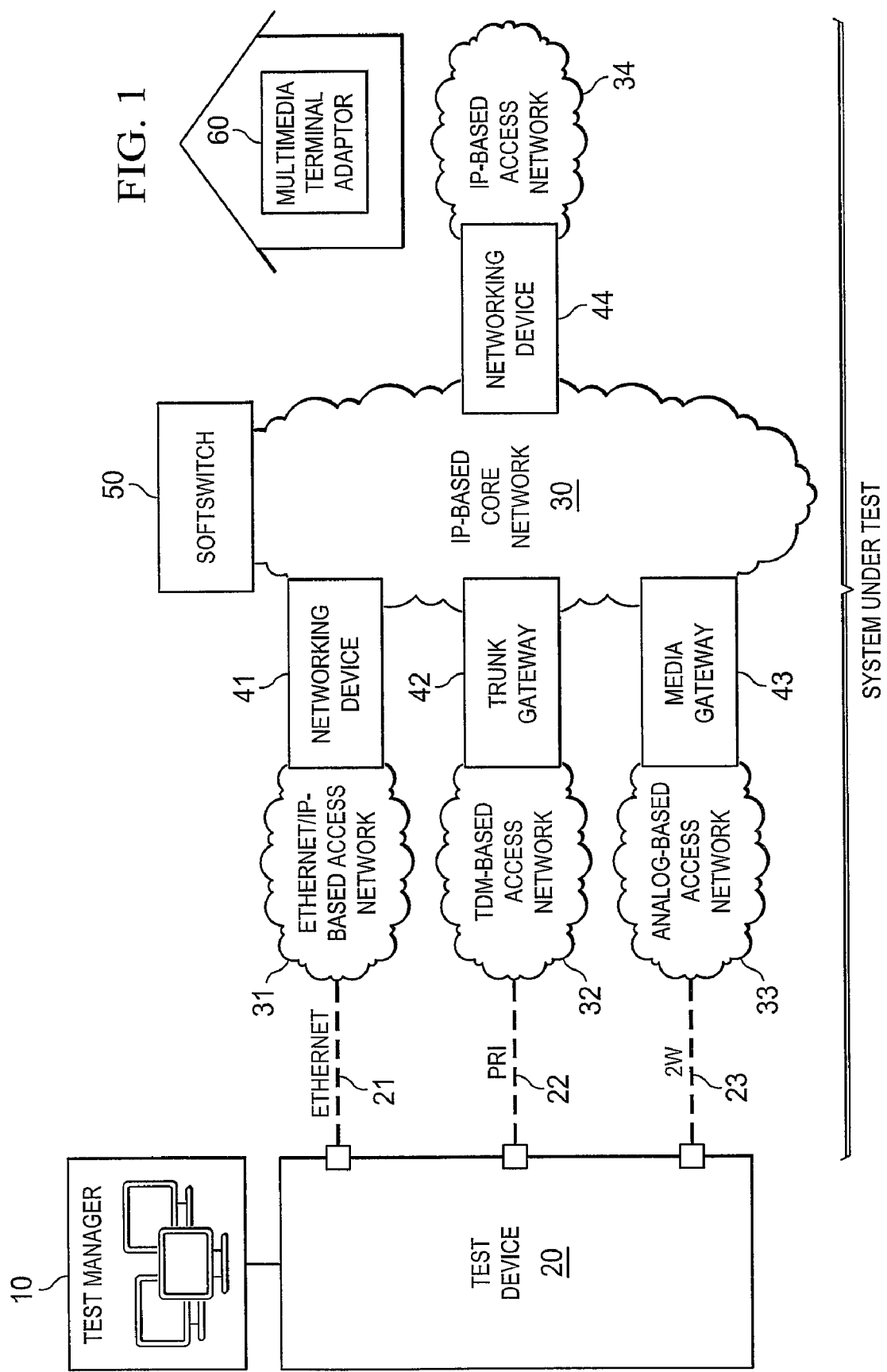
FIG. 1 is a conceptual diagram of a hybrid telecommunications system.

FIG. 1 shows a typical communication network where the access networks are using different technologies, e.g., Ethernet/IP-based 31, TDM-based 32 or analog-based 33, to connect subscribers and are interconnected via a single technology core network which is typically IP-based 30 (the Internet). Active and/or passive techniques may be used to monitor the quality of transmission across this network. In active or intrusive techniques, test traffic is injected by an originating test device (20) in the network via a specific interface, e.g., Ethernet 21, PRI 22 or 2-wire 23, corresponding to the access network as shown in FIG. 1. This traffic is either received and analyzed by one or more terminating test devices (20), or looped back to the same originating test device (20). In passive or non-intrusive techniques, the real traffic is captured and analyzed by test devices (20) placed inside the network. Therefore, active tests are more suitable for measuring perceived end-to-end quality of services and passive tests are more useful for troubleshooting network problems.

In this invention, we are interested in active testing where a single test device (20) acting autonomously or controlled by a test manager (10) is used to measure the end to end quality by means of loopback connections where the reflecting points are located on an IP-based access network 34 as close as possible to the subscriber. This technique saves operating and capital expenditures since the quality assessment process does not require a technician to be present at the remote site to perform testing, nor does it require an additional test device (20). This invention can be operable on converged all-IP networks where the access and core networks are using the same IP technology, as well as hybrid networks where the access and core networks are using different transport technologies. In the latter case, the networks are interconnected via gateways which act as translators for signalling information and media formats.

MGCP and its variant in the cable-based access domain NCS are protocols that allow the control of different gateways at the edge of the IP-based network by means of a call processing device called the call agent (CA) or call manager server (CMS), typically integrated within a soft switches 50.

Figure 2:
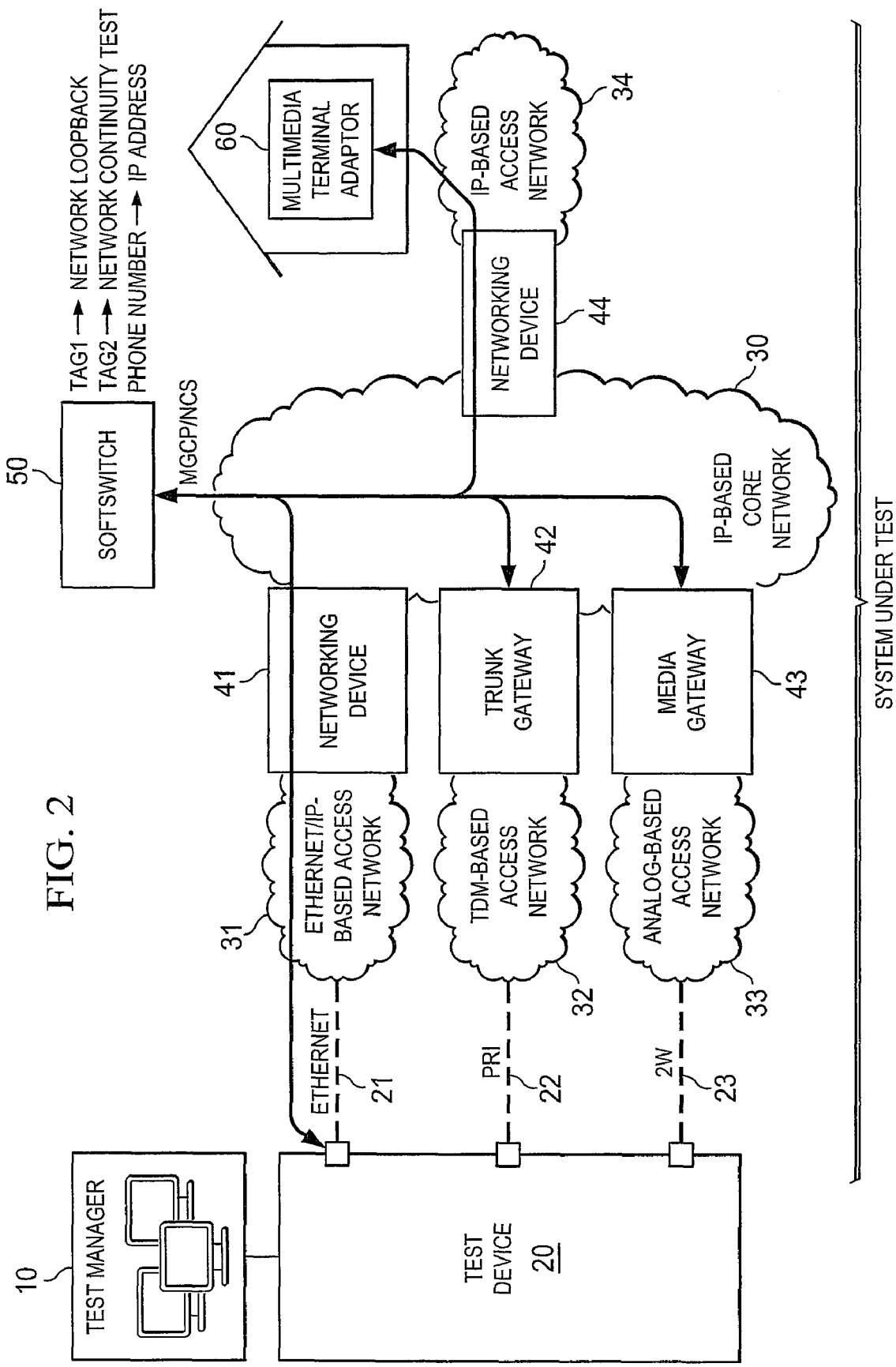
FIG. 2 is a conceptual diagram of the two-level hierarchical structure established by MGCP/NCS in order to control a connection set up between two different endpoints.

FIG. 2 shows the two-level hierarchical structure established by MGCP/NCS in order to control a connection set up between two different endpoints, where the CA is on the top level and the gateways (endpoints) are on the bottom level. The endpoints are basic constructs on the gateways, on which the CA is acting in order to establish connections. A gateway may have one or multiple endpoints. For example, an endpoint may be an analog port on a media terminal adapter and a connection may be established between two endpoints on two different gateways or between two different endpoints on the same gateway.

With respect to MGCP/NCS protocol, it is assumed that the terminating endpoint is on an MTA 60 located at the customer premises and acting as a residential gateway. The test device (20) is acting as the originating media gateway 43 if it is directly connected to an Ethernet/IP based 31 network and manages virtual endpoints. Otherwise, the originating gateway is a separate device and the test device (20) must use the signalling protocol used on the access network in order to communicate its signalling information to the gateway which has to translate it into MGCP/NCS signalling. As shown on FIG. 2, the origination and terminating gateways are communicating separately with the CA which controls the connection setup. Therefore, the originating gateway does not readily communicate any signalling information directly to the terminating gateway. Moreover, the connection modes are decided by the CA and communicated to the respective gateways. For example, when the CA sends a command to a gateway to create a connection in "receive only" mode, it is not allowed to transmit media. This raises the following problem when the gateway is acting as or on behalf of a test device (20) that needs to initiate connections in loopback mode.

Figure 3:
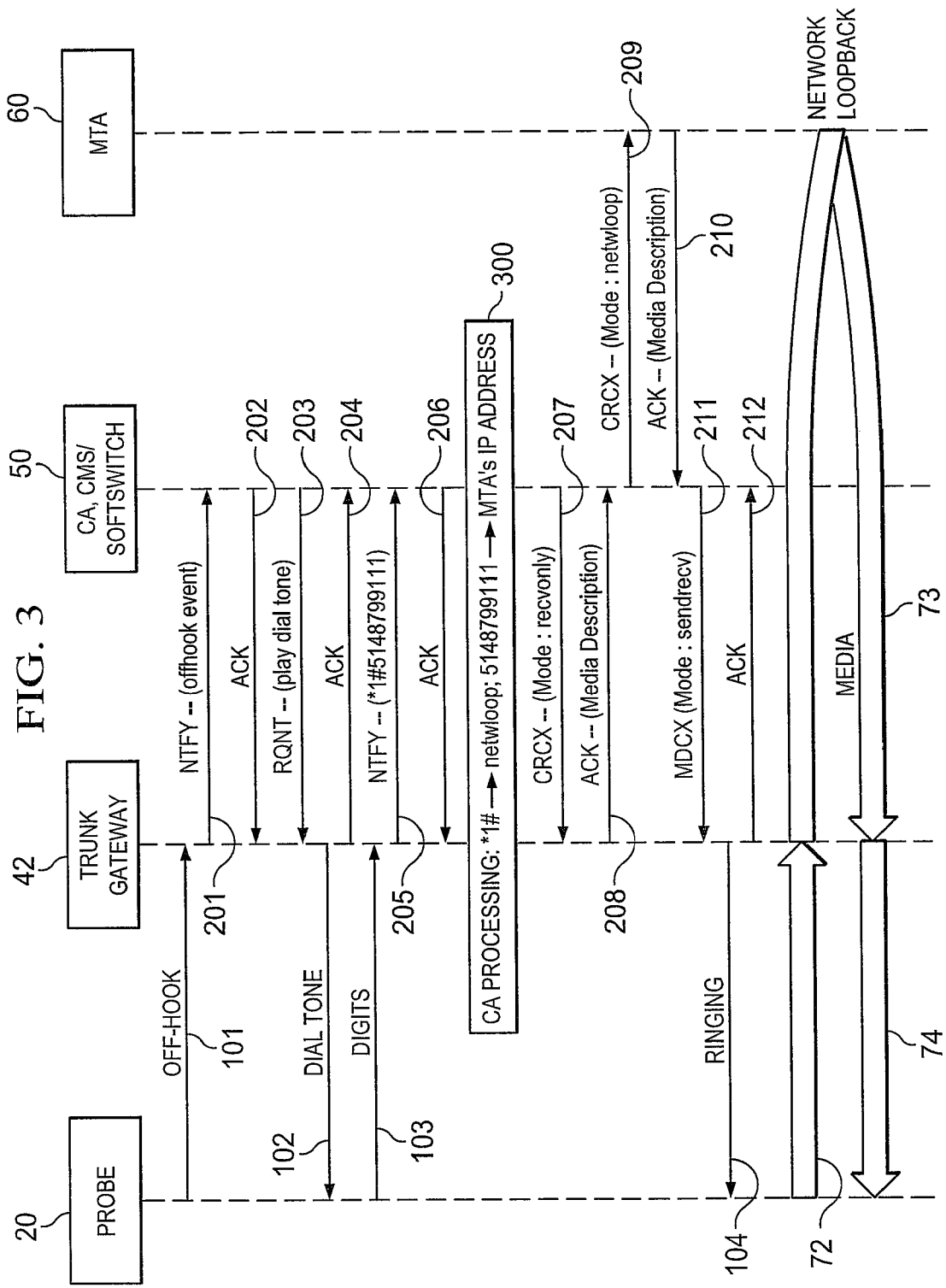
FIG. 3 is a flow diagram that shows how a connection in loopback mode can be established between a Probe and a MTA in accordance with the principles of the present invention.

FIG. 3 describes how a connection in loopback mode can be established between a Probe 20 and a MTA 60. The Probe 20 uses an ISDN Primary Rate Interface (PRI) to connect to a Trunk gateway 42. A signalling protocol related to the ISDN, such as ITU.Q.931 may be used between the Probe 20 and the Trunk gateway 42. The trunk gateway 42 is then considered as the initiating gateway with respect to MGCP/NCS. It communicates directly with the soft switches 50 using MGCP/NCS. The MTA 60 should be pre-configured to communicate with the soft switches 50 and to support MGCP/NCS loopback modes from both hardware and software perspectives.

It is important to note that this architecture and the call flow that will be described in the following paragraphs are only examples of how this invention may be applied. The two gateways may be connected to different soft switches 50 which use a specific protocol to communicate between them, but this would be completely transparent for the connection. Therefore, the soft switches 50 in this example represents the call control entity which may be split into different entities and locations. Moreover, we will not describe the formal call flow for the non-MGCP/NCS signalling part, the MGCP acknowledgment (ACK) responses will not be described as well.

The connection creation steps may be described as follows:
(a) The Probe 20 goes off-hook 101 in order to initiate a test call in loopback mode with the MTA 60.
(b) This information is notified to the Trunk gateway 42 using an ISDN signalling protocol.
(c) The trunk gateway 42 creates or designates an endpoint to handle this connection on behalf of the Probe 20 on the MGCP/NCS domain. Then, it sends an MGCP/NCS notification of the off-hook 101 event to the soft switches 50.
(d) The soft switches 50 sends back a command to play a dial tone 102 to the endpoint and may also send a digit map to allow the gateway controlling the dialing process, e.g., when the dialing is complete, is there a digit map violation, etc. In such case, the digit map must allow the loopback tags. For example, if the loopback tag is a prefix attached in front of the phone number as described in FIG. 3, the *1# sequence should match the digit map.
(e) Upon receipt of the dial tone 102, the probe dials the phone number identifying an endpoint on the remote MTA 60 with a loopback tag.
(f) The Trunk gateway 42 receives the digits 103 and forwards them to the soft switches 50 in a notify MGCP command.
(g) The soft switches 50 analyzes the received sequence of digits 103 according to its mapping function Therefore, it realizes that the tag corresponds to a network loopback mode (netwloop) and the phone number to the MTA 60. Given the success of the mapping procedure, it sends an MGCP create connection command to the trunk gateway 42.
(h) The trunk gateway 42 replies to the soft switches 50 with its media description advertising the main parameters of the media that will be communicated with the remote side, e.g., codec, packetization interval, etc, as well as the media port numbers. Note that the probe 20 is not implied at this stage since the gateway will be the peer of the MTA 60 from a media point of view.
(i) The soft switches 50, knowing the IP address of the MTA 60, sends a create connection command to the MTA 60 and asks it to be in network loopback mode. It forwards also the media description of the trunk gateway 42
(j) The MTA 60 checks the connection mode and the proposed media description of the initiating gateway. If it accepts, it acknowledges the soft switches 50 command and sends back its own media description. It sets its corresponding endpoint in network loopback mode.
(k) The soft switches 50 forwards the MTA 60's media description to the trunk gateway 42 and asks it to be in sendrecv mode.
(l) The trunk gateway 42 is now ready to stream media to the MTA 60. It notifies the probe 20 that the connection is successfully established.
(m) The probe 20 begins streaming media to the trunk gateway 42 in PCM format over a TDM-based circuit.
(n) The trunk gateway 42 converts the PCM traffic into RTP packets and sends them directly to the MTA 60.
(o) The MTA 60 loops the RTP packets back to the trunk gateway 42.
(p) The trunk gateway 42 de-packetizes the RTP packets, converts them back to PCM format and sends them back to the probe 20.

Special settings enable the testing. First, when the media is crossing internetworking devices that integrates Echo Cancellers (EC), such as trunk gateways 42, this may disrupt the test. Actually, when the media is looped back to this device within the echo path delay that the EC will cancel, the EC may consider the looped back media as an echo and consequently cancels it, which causes the loopback test to fail. Therefore, it is recommended to disable any EC on the media path.

In RTP loopback, the RTP packets are looped back without any modification of the RTP header, which may cause an SSRC collision. Actually, each RTP stream is identified by the identifier of the synchronized source (SSRC) of the traffic, e.g., the trunk gateway 42 in the example of FIG. 3. The flow upstream, from the MTA 60 to the trunk gateway 42, must be identified by the SSRC of the MTA 60. However, in RTP loopback, the flows upstream and downstream are both identified by the SSRC of the trunk gateway 42, which creates confusion known as SSRC collision in the trunk gateway 42, and it may drop the packets in this case. This typically occurs in the case of internetworking devices that need to look into the RTP header, such as transcoders on the media path. Therefore, the SSRC collision detection should be disabled for loopback tests Since various modifications can be made in any invention as herein above described, and many apparently widely different embodiments may be made within the spirit and scope of the claims without departing from the spirit and scope, it is intended that all matter contained in the accompanying specification shall be interpreted as illustrative only and not in a limiting sense.

The embodiments of the invention in which exclusive property or privilege is claimed are defined as follows:

1. A method for remote loopback testing across two or more networks with dissimilar transport technologies, wherein control of gateways at the edge of a first network is based upon a Media Gateway Control Protocol/Network-Based Call Signaling (MGCP/NCS) protocol, data is transported on the first network using a first traffic protocol, and data is transported on the second network using a second traffic protocol, and wherein an interface gateway provides an interface between the first network and the second network, the method comprising:

receiving, at the interface gateway, a series of digits from a test probe on the first network, the digits comprising an address and a tag, the address identifying a remote endpoint on the second network, and the tag corresponding to a loopback mode;

forwarding the digits from the interface gateway to a call agent on the second network, the call agent operable to map the address to the remote endpoint and to map the tag to the loopback mode, the call agent directing the remote endpoint to establish a connection in the loopback mode;

receiving, at the interface gateway, a message from the call agent indicating that the remote endpoint is configured in the loopback mode;

disabling synchronized source (SSRC) collision detection and echo cancellation on the interface gateway;

sending, from the interface gateway to the test probe on the first network, a notification that a connection has been established with the remote endpoint;

receiving, at the interface gateway, test data in the first traffic protocol from the test probe;

converting the test data to the second traffic protocol at the interface gateway;

sending the test data in the second traffic protocol to the remote endpoint; and receiving the test data, at the interface gateway, after being looped back from the remote endpoint.

2. The method of claim 1, further comprising:

converting the looped back test data to the first traffic protocol; and sending the looped back test data to the test probe.

3. The method of claim 1, wherein the remote endpoint is a multimedia terminal adapter.

4. The method of claim 3, wherein the address is a phone number associated with an analog port on the multimedia terminal adapter.

5. The method of claim 4, further comprising:

correlating the phone number with and IP address of the multimedia terminal adapter.

6. The method of claim 1, further comprising:

pre-configuring the tags on the interface gateway for connection between the test probe and the remote endpoint.

7. The method of claim 1, wherein the loopback mode is a network loopback mode (RTB LB) or a network continuity mode (Audio LB).

8. The method of claim 1, further comprising:

controlling the exchange of signaling information between the remote endpoint and the interface gateway by means of the call agent.

* * * * *